(12) United States Patent
Burke et al.

(10) Patent No.: US 7,267,862 B1
(45) Date of Patent: Sep. 11, 2007

(54) CONTROLLED COF FILMS

(75) Inventors: Thomas C. Burke, Greenfield, MA (US); Joseph D. Gagne, Holyoke, MA (US)

(73) Assignee: Appleton Papers Inc., Appleton, WI (US)

( * ) Notice: Subject to any disclaimer, the term of this patent is extended or adjusted under 35 U.S.C. 154(b) by 253 days.

(21) Appl. No.: 10/728,726

(22) Filed: Dec. 5, 2003

Related U.S. Application Data

(60) Provisional application No. 60/431,565, filed on Dec. 6, 2002.

(51) Int. Cl.
*B32B 7/02* (2006.01)
*B32B 9/04* (2006.01)
*B32B 7/12* (2006.01)

(52) U.S. Cl. .................. 428/212; 428/220; 428/411.1; 428/423.5; 428/516; 524/186; 524/500

(58) Field of Classification Search ................ 428/516, 428/447, 353, 213, 215; 524/186, 500
See application file for complete search history.

(56) References Cited

U.S. PATENT DOCUMENTS

| | | | |
|---|---|---|---|
| 4,112,158 A * | 9/1978 | Creekmore et al. ...... | 206/524.1 |
| 6,063,445 A * | 5/2000 | Stolk ........................ | 427/306 |
| 6,503,611 B1 * | 1/2003 | Chang et al. ............... | 428/213 |
| 6,902,822 B1 * | 6/2005 | Chang et al. ............... | 428/516 |

* cited by examiner

*Primary Examiner*—Rena Dye
*Assistant Examiner*—Lawrence Ferguson
(74) *Attorney, Agent, or Firm*—Jacobs & Kim LLP; David Jacobs

(57) ABSTRACT

Disclosed are methods and compositions of films using selected blends of primary and secondary fatty amide additives at critical ratios, which enable the primary fatty amides to interact favorably with the secondary amides so as to provide controlled COF and other useful surface properties in polyolefin and other films.

8 Claims, 5 Drawing Sheets

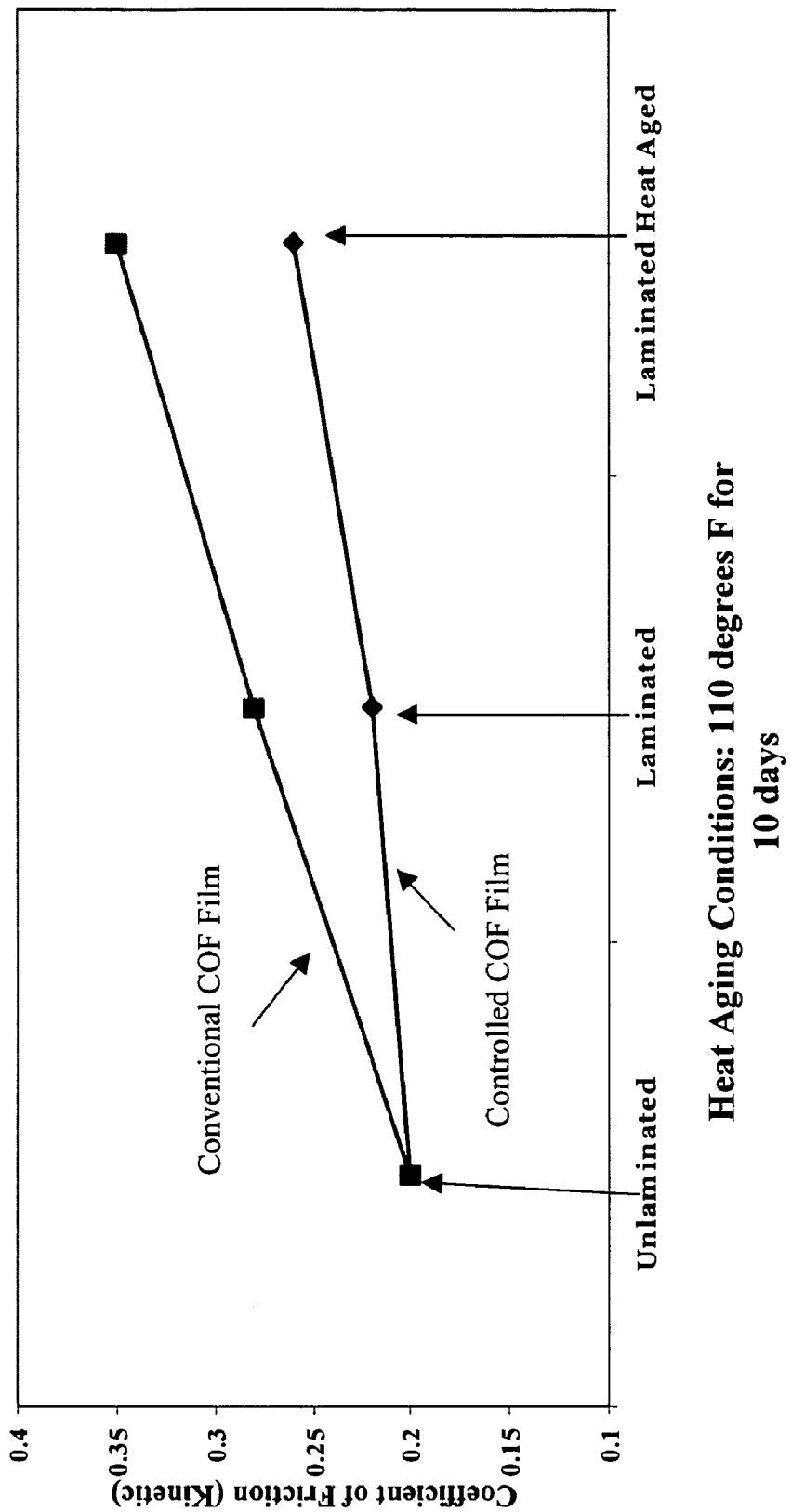

TABLE 1

|  | COF Values with 65% LDPE + 35% mLL laminated to PET | |
|---|---|---|
|  | 300 ppm erucamide / 300 ppm oleyl palmitamide / 300 ppm steryl erucamide | 500 ppm erucamide |
| Unlaminated | 0.2 | 0.2 |
| Laminated | 0.22 | 0.28 |
| Laminated Heat Aged | 0.26 | 0.35 |

CONTROLLED COF FILMS

CROSS-REFERENCE TO RELATED APPLICATION

The present Application for United States Patent claims the priority of U.S. Provisional Application for Patent Ser. No. 60/431,565 filed on Dec. 6, 2002.

BACKGROUND OF THE INVENTION

Field of the Invention

The present invention relates to the composition and manufacture of films for packaging and other applications, and in particular, relates to the use of blends of primary and secondary fatty amide slip additives that control the coefficient of friction (COF) and other surface characteristics of polyolefin and other films.

The use of primary fatty amide slip agents such as erucamide, oleamide and stearamide in polyolefin packaging films to control the coefficient of friction (COF) and other surface characteristics have been well known in the packaging and film making industry for many years.

Thus, for example, U.S. Pat. Nos. 6,497,965 and 6,518,320, the teachings of which are incorporated herein by reference as if set forth herein in their entireties, indicate the use of amides in composite polypropylene films and polyolefin films and foams, respectively.

In films, the low molecular weight, polar moleculars depend on their incompatibility and small size to allow them to migrate to the surfaces of the thin films and thereby modify the film's surface characteristics by reducing friction, making the film more slippery. The term "slip" is often used interchangeably with erucamide in the packaging industry. It is important that the migration or bloom occurs quickly—generally within 12 to 24 hours—so as to keep up with the scheduling and turnaround times necessary in the industry.

The use of secondary fatty amide additives are primarily isolated to the injection molding industry for mold release agents, and to a much lesser extent, in the packaging film industry. Secondary fatty amides such as stearyl erucamide, erucyl erucamide, oleyl palmitamide and stearyl stearamide, because of their larger molecular weight and lower polarity, are much slower to migrate or bloom to the surface of the film and have less of an ability to lower the coefficient of friction (COF) in the film compared to primary fatty amides.

Generally there are 3 or 4 common ranges for COF for films in the packaging industry as specified by both the manufacturers and the end user film converters. A "high slip" film is generally considered to be film with COF values between 0.10 to 0.20; a "medium high slip" film is generally considered to have a COF value of between 0.15 to 0.30; and a "medium slip" film is generally considered to have a COF value of 0.2 to 0.5. There is also a "non slip" category, which is generally considered in the industry to have a COF value of above 0.4 or 0.5.

Of the primary fatty amide containing films, high slip (low COF) films are the films most commonly used. Once a lower COF level of 0.10 is achieved, adding more slip to the film will not result in lower COF levels. Once the surface of the film has been saturated with a thick layer of slip, the natural endpoint to the minimum COF of the film will be achieved and further addition beyond that will have no further effect on the COF. In fact, it will make printing, heat sealing and adhesive curing more difficult for the converting stages of the packaging film, as excessive levels of slip additives can have negative effects.

The medium high and medium COF films are more difficult to manufacture and to control for the converting steps, because in order to maintain these COF value ranges of 0.15 to 0.30 and 0.20 to 0.50 respectively, the industry relies on putting lower and lower amounts of primary fatty amide additive in the film, which become unpredictable and often problematic. The issues around these COF range films have been a source of continual complaints against film manufacturers and a source of costly scrap for decades. Each polymer type, with varying density and viscosities, will have a different optimal amount of additive, which is often difficult to predict and replicate. The COF value for these ranges depends on precise amounts of slip to migrate to the surface, making it difficult to achieve a range respectively.

To further complicate the process, adhesives used to laminate 2 or more layers of films, and inks used to print on the films or to come in contact with the surface of the films during lamination, have a strong tendency to absorb the slip from the films' surfaces in a process termed "slip scalping" or "slip scavenging." This tends to increase the COF value beyond the desired or usable range. Also problematic is that films that are laminated to other substrates, such a PET, OPP and particularly Nylon, have a strong tendency to absorb some of the fatty amide slip agents from the surface of the polyolefin film. The transfer of slip will tend to increase the COF value of the polyolefin film beyond a desired range (which can cause the film to drag across surfaces and track poorly) as well as decreasing the already low COF value of the PET, OPP or Nylon to the point where the outside of the package is now below the desired range (causing such issues as stacking problems with the packages slipping off one another). Other processes required to be performed on the polyolefin film, such as corona treating the surface with high voltage electronic discharge, have enough power to burn off or otherwise limit the ability of the proper level of fatty amide slip agent to migrate to the film surface, thus also affecting the COF.

Given these circumstances, it is apparent to those familiar with the art that serious limitations exist in the current polyolefin films available commercially.

It would therefore be desirable to provide improved films and laminates of films, having improved, controlled COF characteristics.

SUMMARY OF THE INVENTION

The present invention provides methods and compositions that overcome these limitations of the prior art, by providing unique blends of the proper types and levels of select primary and select secondary fatty amide additives at critical ratios, which allow the primary fatty amides to interact favorably with the secondary amides in such a manner as to allow certain previously unattainable surface properties in films, in a time frame that is acceptable to industry standards.

BRIEF DESCRIPTION OF THE DRAWING FIGURES

CHART 1 is a graph comparing the COF of conventional vs. controlled-COF films on accordance with the invention, in heat-aged laminations.

TABLE 1 shows COF values for various films in accordance with the invention, in unlaminated, laminated and laminated heat-aged applications.

TABLES 2 and 3 show characteristics of other films in accordance with the present invention.

DETAILED DESCRIPTION OF THE INVENTION

Prior Art Films

Figure 2:
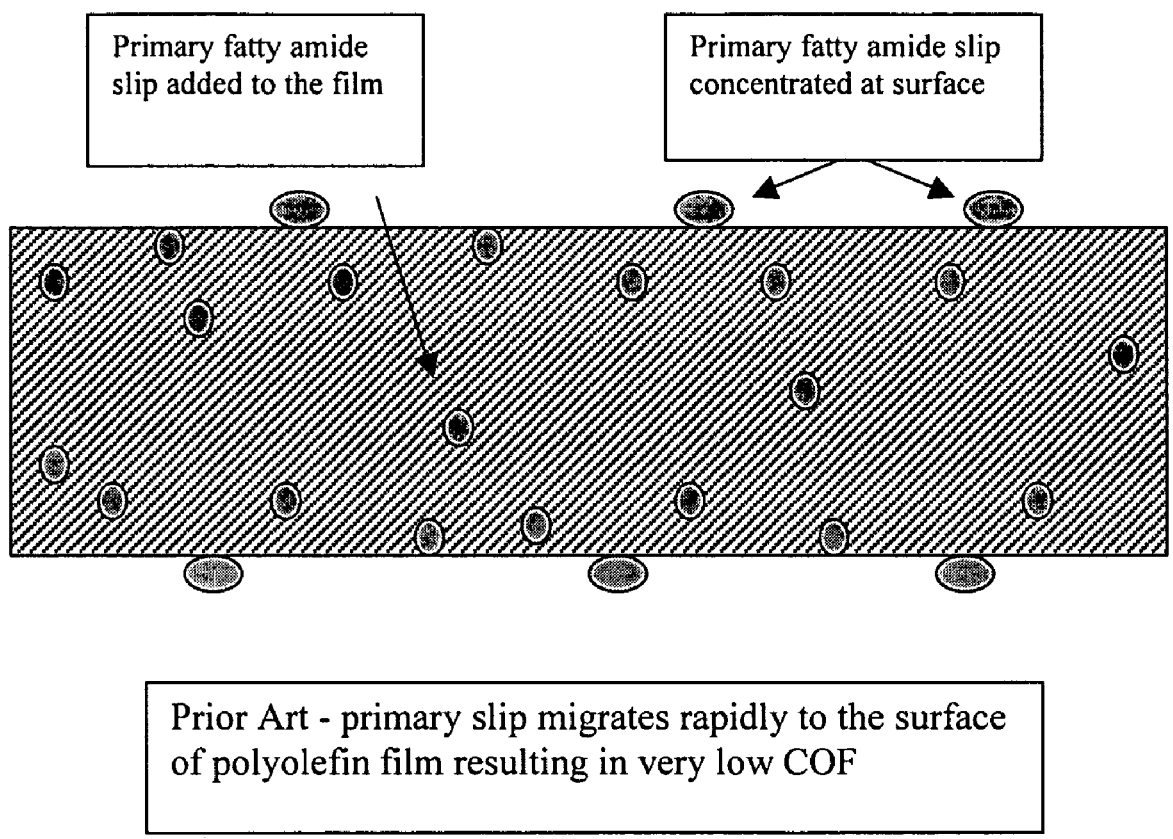
FIG. 2 is a schematic diagram showing a prior art film, having very rapid migration of the primary slip to the surface of the film.

Used alone in a film, a primary amide migrates very quickly to the surface of the film, rapidly lowering the coefficient of friction (COF) as the additive acts to lubricate the film surface. By way of example, FIG. 2 is a schematic diagram of a prior art film, showing rapid primary amide migration and a resulting very low COF.

Figure 3:
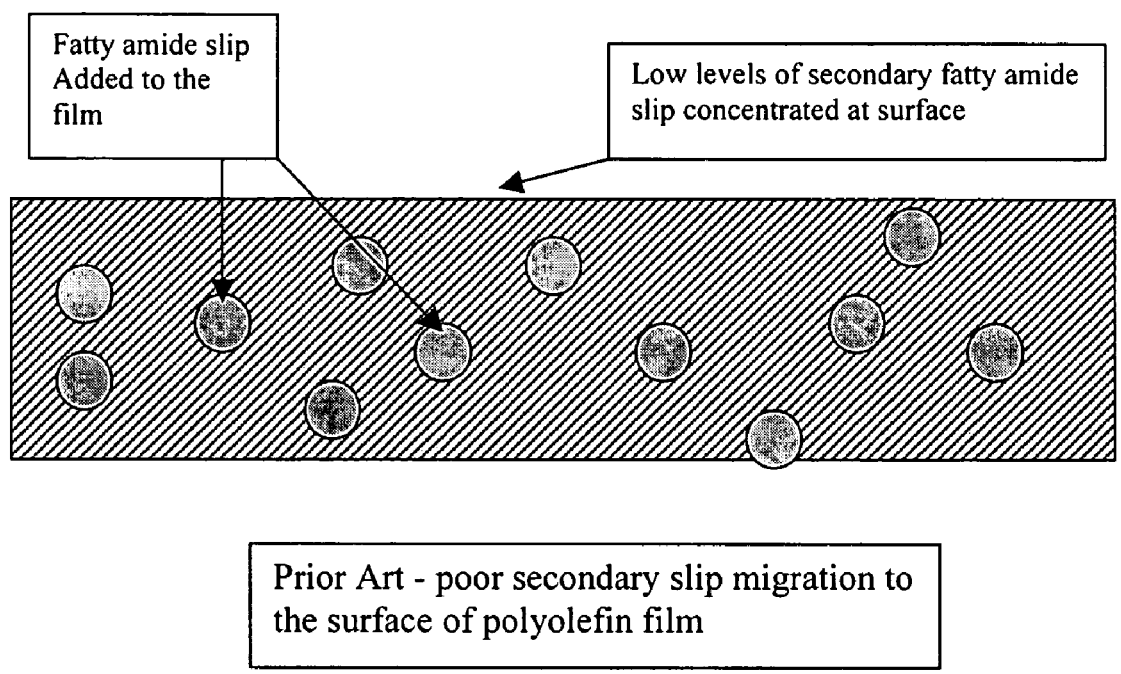
FIG. 3 is a schematic diagram showing a prior art film, having poor secondary slip migration to the surface of the film.

Conversely, secondary amides bloom very slowly, over a period of days to as long as weeks, and generally give a higher final COF value than is desired. By way of example, FIG. 3 shows a conventional film having a poor migration rate of secondary amide to the film surface, with resulting higher than desired COF.

The Invention

Figure 1:
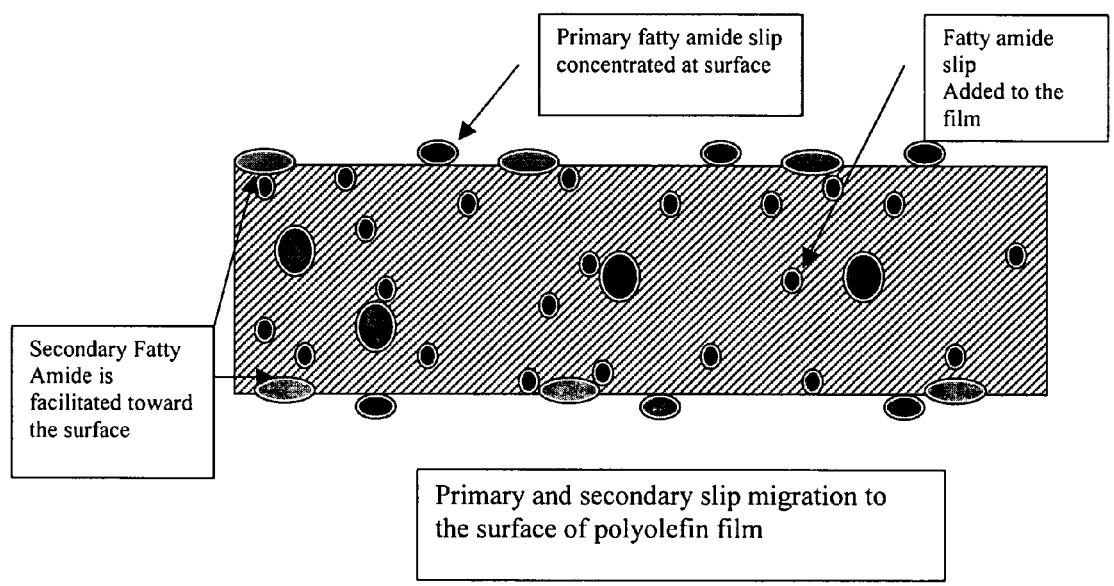
FIG. 1 is a schematic diagram showing a film in accordance with the invention.

However, when specific primary and secondary amides are combined together in one film, the smaller, more mobile primary amide acts to push the larger secondary amide molecules along to the surface, facilitating the migration of the secondary slip to the surface of the film. This is shown in the schematic diagram of FIG. 1, which shows a monolayer or single layer polyolefin film in accordance with the invention. In particular, FIG. 1 also shows the migration of the primary and secondary amide slip agents. The molecules also orient differently in relationship to the film surface when added together, setting up a beneficial, relatively thick layer of additive with a COF level that can be designed to maintain the range desired by the end application. The combined effect is a quick blooming film with a more stable COF value that is less likely to be scalped by adhesives and inks and less prone to being transferred to PET, OPP or Nylon than films made with just primary fatty amides. The exact COF range desired can be "dialed in" by properly choosing the correct ratio of primary to secondary slip along with the specific type of each.

The Applicants' research indicated that secondary fatty amide to primary fatty amide ratios of 1:1 worked well and were complimentary, but resulted in films that were in the 0.13 to 0.16 COF range. Testing indicated a reduction in slip scalping and slip transfer. Increasing the ratio to 2:1 showed superior performance in achieving a more desired range of 0.18 to 0.25 COF values. The post lamination process also showed a more beneficial retention of 0.25 COF compared to the 1:1 ratio. Further work showed a 3:1 secondary fatty amide to primary fatty amide was desirable for achieving a film in the medium COF range of 0.24 to 0.45 range.

Example 1

One such example of a controlled COF film was manufactured by dry blending 64% of a homopolymer low density polyethylene (1.8 MI/0.924 g/cc) resin, 35% metallocene linear low density polyethylene (1.0 MI/0.920 g/cc), 300 ppm erucamide, 300 ppm oleyl palmitamide, 300 ppm stearyl erucamide and 3000 ppm of diatomaceous earth antiblock. The ratio of secondary amide to primary amide was set at 2:1. The erucamide, oleyl palmitamide, stearyl erucamide and antiblock were added via a master batch based on 10 MI LDPE resin in a pre-compounded concentrate form. The ingredients were weighed via mass balance. The mix was extruded on a 4.5 inch diameter extruded with a 15 inch diameter blown film line and drawn down to a 2.0 mil final film thickness. The film was slit in line to a sheet form from the collapsed bubble form and would single layer. The film was later laminated to printed PET via a 2-part water based urethane adhesive. The tests indicated minimal slip transfer to the PET (see TABLE 1) and very good retention of the COF values on the polyethylene side of the laminate at 0.25 COF. The film was run on a Packman Vertical Form, Fill and Seal (VFFS) machine and showed superior COF retention and performance versus the conventional COF film.

A second trial of the same film was run on a Hassen Vertical Form, Fill and Seal (VFFS) machine and showed superior COF retention and performance versus the conventional COF film.

Example 2

A second such example of a controlled COF film was manufactured by dry blending 89% of a 6% ethylene vinyl acetate resin (1.8 MI/0.925 g/cc) with 10% of an alpha olefin linear low density polyethylene (1.0 MI/0.920 g/cc) with 400 ppm erucamide, 400 ppm oleyl palmitamide, 400 ppm stearyl erucamide and 3000 ppm of diatomaceous earth antiblock. The ratio of secondary amide to primary amide was set at 2:1. The erucamide, oleyl palmitamide, stearyl erucamide and antiblock were added via a master batch based on 10 MI LDPE resin in a pre-compounded concentrate form. The ingredients were weighed via mass balance. The mix was extruded on a 6 inch diameter extruder with a 23" diameter blown film die and drawn down to a 2.5 mil final film thickness. The film was slit in-line to a sheet form from the collapsed bubble form and then wound into a single sheet. The film was later laminated to printed PET via a 2-part water based urethane adhesive. The tests indicated minimal slip transfer to the PET and very good retention of the COF values on the polyethylene side of the laminate of 0.22.

ADDITIONAL EXAMPLES

Example 3

Another example utilizes a 60% octene LLDPE (0.920 g/cc; 1.0 MI) resin, 25% octene polyolefin plastomer linear resin, 14.6% LDPE, 300 ppm erucamide slip additive, 300 ppm oleyl palmitamide (OP) slip additive, 300 ppm stearyl erucamide (SE) slip additive and 3100 ppm of diatomaceous earth antiblock in a mono layer. The film requires a COF of 0.15 to 0.30 and needs to maintain the value through lamination to a 1.0 mil Nylon film. The film is adhesively laminated with a 2-part water based urethane adhesive. TABLE 2 set forth below shows a comparison of the prior art film with erucamide only and the preferred film structure. It will be appreciated that the erucamide slip transfer from the prior art film caused the COF on the Nylon outer film to decrease so low that it produced tracking problems on the user's equipment, including uneven feeding from side to side of the film through the converting equipment. In the case of the film produced in accordance with the invention, however, because of the unique combination of properties associated with the controlled COF film, the laminate of this film to Nylon did not cause the erucamide to transfer to the Nylon, thus allowing the COF of the Nylon to remain close to its original value prior to being laminated.

TABLE 2

| Sealant Film Laminated to: | Test Done | Prior to Lamination | Erucamide Containing PE Sealant Film | Erucamide + Secondary Amide Containing PE Sealant Film |
|---|---|---|---|---|
| Oriented PET | COF PET/PET | 0.38 | 0.21 | 0.34 |
| Oriented Nylon | COF Nylon/Nylon | 0.2 | 0.13 | 0.23 |

Example 4

Another example of such an improved film is a mono layer film composed of 50% of a 6% ethylene vinyl acetate (0.925 g/cc; 1.8 MI) resin, 40% of a octene LLDPE (0.920 g/cc; 1.0 MI) resin, 9.82% LDPE (0.923, 2.0 MI) resin, 300 ppm of a erucamide, 750 ppm of a stearyl erucamide and 4000 ppm of a diatomaceous earth antiblock, blown extruded on a 23 inch diameter IBC cooled machine to a thickness of 2.00 mils. The film is adhesively laminated with a solvent based urethane adhesive to a 48 gauge oriented PET film on a conventional laminator with a heat cured oven. It is well known in the art that slip bottom on the lamination surfaces of the sealant film will reduce both the initial bond strength and, in many cases, the aged bond strength of the adhesive to the two substrates. In particular, TABLE 3 shows a comparison of the adhesive strength of the standard slip modified films versus the film described above. Those skilled in the art will appreciate that the improvements shown represent a significant advancement in the industry.

TABLE 3

Effect of S Grade on Solvent Based Adhesives

| | | | | | Bond Strength (gm/inch) | |
|---|---|---|---|---|---|---|
| Film | Gauge | Slip Level | Color | Laminated to | Initial | 7 Day Aged |
| 5247S | 2 mil | 1000 ppm | clear | PET | 423 | 651 |
| 5246 | 2 mil | 1000 ppm | clear | PET | 258 | 492 |

Example 5

A further example of such an improved film is a mono film composed of 50% octene LLDPE (0.20 g/cc; 1.0 MI) resin, 40% of a 12% ethylene vinyl acetate (0.932 g/cc; 0.4 MI) resin, 13.5% titanium dioxide filled white concentrate, 7750 ppm of diatomaceous earth antiblock, 400 ppm of erucamide slip and 350 ppm of OP slip/350 ppm of SE slip extruded on a 15" diameter die with 4.5" diameter extruder to a thickness of 4.5 mils. The film is adhesively laminated with a water based urethane adhesive to a 0.48 mil thick oriented PET film reverse printed with solvent based ink on a conventional laminator with a heat cured oven. The film allowed significantly better variation on COF, lower transfer of slip to the PET and less scalping from the adhesive and ink used to print the package.

Example 6

A further example of such an improved film is a mono film composed of 90% ethylene vinyl acetate (0.925 g/cc; 1.8 MI) resin, 9.8% LDPE (0.923 g/cc; 2.0 MI) resin, 250 ppm of erucamide, 350 ppm of OP slip, 350 ppm of SE slip and 5000 ppm of diatomaceous earth antiblock extruded on a 20" diameter IBC die with 5" diameter extruded to a thickness of 2.5 mils. The film is extrusion laminated with 3.0 pounds/ream of modified polyethylene resin to 0.48 mil thick metallized oriented PET surface printed with a solvent based ink system. THe film showed a 50% improvement in standard deviation on coefficient of friction, improved COF control at elevated temperatures and on metal surfaces compared to the standard 5% EVA/LLDPE film.

Example 7

Another example of such an improved film is a mono film composed of 59% octene LLDPE (0.920 g/cc; 1.0 MI) resin, 25% of a 6% ethylene vinyl acetate (0.925 g/cc; 1.8 MI) resin, 6.5% LDPE (0.923 g/cc, 2.0 MI) resin, 6.5% titanium dioxide white pigment, 300 ppm of erucamide, 300 ppm of OP slip, 300 ppm of SE slip and 3500 ppm of diatomaceous earth antiblock extruded on a 15" diameter die with a 4.5" diameter extruder to a thickness of 4.0 mils. The film is adhesively laminated to a second polyethylene film composed of 78% metallocene LLDPE (0.920 g/cc; 1.0 MI) resin, 19.5% LDPE (0.923 g/cc; 2.0 MI) resin, 300 ppm of erucamide, 350 ppm of OP slip, 350 ppm of SE slip and 3500 ppm of diatomaceous earth antiblock extruded on a 15" diameter die with a 4.5" diameter extruded to a thickness of 1.5 mils.

Example 8

A further example of such an improved film is a coextruded 3 layer film composed of an first layer made of 75% hexene LLDPE (0.920 g/cc; 1.0 MI) resin, 25% LDPE (0.923 g/cc; 1.0 MI) resin 10%-30% in cross sectional thickness, a second layer made of 75% hexene LLDPE (0.920 g/cc; 1.0 MI) resin, 24.8% LDPE (0.923 g/cc; 1.0 MI) resin, 200 ppm of erucamide, 250 ppm of SE slip and 250 ppm of OP slip 40%-60% in cross sectional thickness, a third layer made of 50% octene LLDPE (0.920 g/cc, 1.0 MI) resin, 27% polybutylene resin (0.918 g/cc; 0.95 MI) 22.8% of a 4% ethylene vinyl acetate (0.923 g/cc; 1.3 MI) resin, 1100 ppm of erucamide, 1700 ppm of SE slip, 1700 ppm of OP slip and 3300 ppm of diatomaceous earth antiblock at 10%-20% cross sectional thickness laminated to a layer of 0.48 mil thick metallized PET, 0.75 mil aluminum foil and 0.48 mil oriented PET outer films. The film is then converted for a peelable coffee application with better COF consistency on the inside sealant layer, less slip transfer to the outside PET layer of the package and higher adhesive bond strength between the 3 layer polyethylene film and the metallized PET.

CONCLUSION

The methods and compositions of films described above advantageously employ selected blends of primary and secondary fatty amide additives at selected ratios, which enable the primary fatty amides to interact favorably with the secondary amides so as to provide controlled COF and other useful surface properties in polyolefin and other films.

Those skilled in the art will appreciate that numerous variations and additional examples are possible and are within the spirit and scope of the invention, which is limited only by the claims appended hereto.

We claim:

1. A thin polymer film comprising:
   one or a blend of non-polyolefin resins comprising any of polyamide 6, polyamide 6,6, or polyester terephthalate resins, forming a layer having opposed first and second surfaces, and
   a migratory additive comprising a blend of secondary amides about 1 part oleyl palmitamide and 1 part stearyl erucamide;
   and further comprising between 25 ppm and 5000 ppm of a primary amide of general structure R—CO—NH2 and between 25 ppm and 5000 ppm of at least one secondary amide of general structure R—CO—NH—R',
   wherein the R and R' can include any of erucic, oleic, palmitic, behemic, capric, lauric or stearic functional groups of between 9 to 30 carbon atoms,
   such that the ratio of primary amide to secondary amide is between about 1:1 and 1:3.

2. The film of claim 1, wherein the film may be printed in a decorative manner.

3. A film according to claim 1, wherein the film is joined to a secondary film by adhesives, extruded polymer or by thermal bonding, and the secondary film may be composed of any of a polyolefin, nylon or polyester film or multiple layers of other films.

4. A thin polyolefin film comprising:
   one or a blend of polyolefins, comprising any of LLDPE, LDPE, EVA, POP, mLL, HDPE, polypropylene, or EVOH resins, forming a layer having opposed first and second outer surfaces, and
   a migratory additive comprising a blend of secondary amides about 1 part oleyl palmitamide and 1 part stearyl erucamide,
   and further comprising between 25 ppm and 5000 ppm of a primary amide of general structure R—CO—NH2 and between 25 ppm and 5000 ppm of at least one secondary amide of general structure R—CO—NH—R'.
   wherein the R and R' can include any of erucic, oleic, palmitic, behemic, capric, lauric or stearic functional groups of between 9 to 30 carbon atoms,
   such that the ratio of primary amide to secondary amide is between about 1:1 and 1.3.

5. The film of claim 4 further wherein the migratory additive comprises the primary amide erucamide.

6. A thin, multi-layer polyolefin film comprising:
   at least 2 layers, having opposed first and second outer surfaces,
   with the first outer layer comprising one or a blend of polyolefins(s), and
   a second outer layer comprising one or a blend of polyolefin(s), and
   a migratory additive comprising a blend of secondary amides comprising about 1 part oleyl palmitamide and 1 part stearyl erucamide,
   at least one layer comprising between 25 ppm and 5000 ppm of a primary amide of general structure R—CO—NH2 and between 25 ppm and 5000 ppm of at least one secondary amide of general structure R—CO—NH—R',
   wherein the R and R' can include any of erucic, oleic, palmitic, behemic, capric, lauric or stearic functional groups of between 9 to 30 carbon atoms,
   such that the ratio of primary amide to secondary amide is between about 1:1 to 1:3.

7. The thin multi-layer film of claim 6, further comprising additional inner layers comprising any of polyolefin or other thermoplastic resins.

8. A thin multi-layer film according to claim 6, wherein the migratory additive is the primary amide erucamide.

* * * * *